United States Patent
Obrestad et al.

(12) 
(10) Patent No.: US 6,171,358 B1
(45) Date of Patent: Jan. 9, 2001

(54) CALCIUM NITRATE BASED FERTILIZER

(75) Inventors: Torstein Obrestad, Ulefoss; Johanne Rødsvik; Torbjørn Legard, both of Porsgrunn, all of (NO)

(73) Assignee: Norsk Hydro ASA, Olso (NO)

(*) Notice: Under 35 U.S.C. 154(b), the term of this patent shall be extended for 0 days.

(21) Appl. No.: 09/180,869

(22) PCT Filed: May 14, 1997

(86) PCT No.: PCT/NO97/00126

§ 371 Date: Feb. 24, 1999

§ 102(e) Date: Feb. 24, 1999

(87) PCT Pub. No.: WO97/45382

PCT Pub. Date: Dec. 4, 1997

(30) Foreign Application Priority Data

May 24, 1996 (NO) .................................................... 962119

(51) Int. Cl.[7] .............................. C05C 5/00; C05C 5/04; C05C 7/00; C05C 7/02; A01N 25/00

(52) U.S. Cl. ....................... 71/58; 71/28; 71/31; 71/59; 71/62; 71/64.03; 71/63; 23/313 R; 23/313 P

(58) Field of Search .................................. 71/28, 31, 58, 71/59, 62, 64.03, 63; 23/313 R, 313 P

(56) References Cited

U.S. PATENT DOCUMENTS 5,698,002 * 12/1997 Hudson ..................................... 71/28

FOREIGN PATENT DOCUMENTS

| 1311065 | 3/1973 | (GB) . |
| 1382870 | 2/1975 | (GB) . |
| 53-27564 | 3/1978 | (JP) . |
| 54-85957 | 7/1979 | (JP) . |

OTHER PUBLICATIONS

WPI/Derwent's abstract, No. 79–60872B, week 7933, Abstract of JP 54085957 (Shimohiro I), Jul. 9, 1979.

* cited by examiner

*Primary Examiner*—Steven P. Griffin
*Assistant Examiner*—Eileen E. Nave
(74) *Attorney, Agent, or Firm*—Wenderoth, Lind & Ponack, L.L.P.

(57) ABSTRACT

Homogeneous calcium nitrate based fertilizers containing sulphur, and method for their preparations. Solid gypsum and/or a slow reacting sulphate mineral is mixed with melted calcium nitrate fertilizer at a temperature of 90–110° C. and kept at this temperature for 3–15 minutes and subsequently particulated at a temperature of 80–110° C. The particulation by prilling is preformed at 95–110 ° C. and the particulation by granulation is performed at 90–110° C. The fertilizer is a homogeneous composition of a calcium nitrate fertilizer and gypsum and/or a slow reacting sulphate mineral comprising 0.1–5.0 weight % $SO_4$—S, 14–19 weight % water soluble calcium and 16–21 weight % total calcium, and 0–3.0 weight % water soluble magnesium. The fertilizer may contain microamounts of Se and/or Co. and/or micronutrients like Mn, Cu, B and Zn.

11 Claims, No Drawings

CALCIUM NITRATE BASED FERTILIZER

The present invention relates to calcium nitrate based fertilizers containing sulphur and a process for making such fertilizers.

Calcium nitrate is widely used within horticulture and as a dry product on open fields. There are two major types of calcium nitrate, one made from acidulation of calcium carbonate by nitric acid and one obtained as a by-product from nitrophosphate fertilizer processes. The latter normally contains 75–81 weight % $Ca(NO_3)_2$, 5–9 weight % $NH_4NO_3$ and 12–14 weight % water of crystallization. This type is usually called NH—CN (Norsk Hydro Calcium Nitrate). In the following the abbreviation CN will be used for both these types of fertilizer.

Over the last years there has been an ever increasing demand for sulphur in fertilizers in general, even for special applications of CN-fertilizers sulphur has been required. For some markets and crops there has also been a demand for CN-fertilizers containing Mg, Se, Co and some micronutrients in addition to sulphur.

In order to meet the demands for new fertilizers the simplest solution seemed to be blending various S-containing fertilizers like ammonium sulphate or potassium sulphate, but when other ingredients like Mg, Se etc. should be added, segregation problems would inherently arise. Another criteria will of course be the price of the various components and it would be advantageous to use cheap sulphur sources like gypsum, kieserite and langbeinite, but again segregation problems were experienced.

Preparation of homogeneous CN-based fertilizers by particulation of melts or solutions of CN and sulphur sources like ammonium- or potassium sulphate did however prove to be most difficult due to the low ability to tie up water of crystallization possessed by these two sulphur sources. Possible application of gypsum and/or kieserite for making homogeneous fertilizers was then investigated.

From Japanese patent application J54085957 it is known preparation of a fertilizer comprising mixing calcium nitrate, gypsum and superphosphate of lime and then granulating the mixture. Mixing is performed at 100–120° C. and the molten mixture is extruded, cut to a size of 2–3 mm and cooled and dried. The amount of superphosphate of lime is 50–70% of the calcium nitrate. Firstly, this fertilizer contains large amounts of phosphate and no magnesium. Secondly, the particulation process is most uneconomical.

Further it is known from J53027564 to coat CN-fertilizers with gypsum during the spraying of CN melt in cooling air containing gypsum powder. This fertilizer is stated to have a prolonged effect. Its sulphur content will however be far too low to meet the requirements which the present invention has to meet.

It is also known to add minor amounts of CN to granulated ammonium sulphate as a binder and to add minor amounts of ammonium sulphate and calcium nitrate to ammonium nitrate to improve its crushing strength, but none of these publications solve the problems related to making homogeneous CN-based fertilizers.

The main object of the present invention was to arrive at a homogeneous CN-based fertilizer containing sulphur and optionally magnesium, selenium, cobalt and micronutrients.

Another object was to arrive at a cost effective continuous process for making homogeneous sulphur containing CN-based fertilizers which could be particulated.

A further object was to arrive at a process for making homogeneous sulphur containing CN-based fertilizers containing magnesium and optionally selenium, cobalt and micronutrients.

Application of normal S-sources like ammonium sulphate and potassium sulphate were first investigated. It was then found that when these sources are mixed with CN melt the following reactions will take place:

1. $(NH_4)_2SO_4 + Ca(NO_3)_2 \rightarrow CaSO_4 + NH_4NO_3$
2. $K_2SO_4 + Ca(NO_3)_2 \rightarrow KNO_3 + CaSO_4$ The formation of gypsum consumes calcium nitrate and the melt loses its ability to solidify due to less power to tie up water of crystallization. Accordingly, the two S-sources were found to be too difficult to apply in CN-based fertilizers.

Gypsum ($CaSO_4 1/2 H_2O$) was expected to not react with CN melt and should therefore constitute a cheap S-source. Even though gypsum is not water soluble, several agronomical examinations have shown that gypsum is readily available to plants. Different gypsum sources can be utilized, such as dead burned gypsum and gypsum with hydrate water up to dihydrate, the hemi hydrate form is however preferred.

Kieserite ($MgSO_4 H_2O$) is both a Mg- and S-source which is considered to be water soluble. By mixing this salt into a CN melt the following reaction was found to take place:

3. $MgSO_4 H_2O + Ca(NO_3)_2 \rightarrow CaSO_4 + Mg(NO_3)_2 + H_2O$

It was further found that if the $Mg(NO_3)_2$ content became too high, solidification problems would occur. However, trials carried out revealed surprisingly that reaction no. 3 did not take place at a significant rate. During further laboratory tests at which kieserite was thoroughly mixed into CN melt for several minutes it was confirmed that said reaction did not result in solidification problems. The investigations also showed that reaction 3 indeed did take place at the surface of each kieserite crystal, but the gypsum formed a thin coating that protected the crystals from further attack by the CN melt. This formation of gypsum coating and the slow dissolving time of the kieserite mineral in general seemed to give possibilities for homogeneous distribution of fine kieserite crystals in the CN melt prior to solidification and thereby make it possible to utilize this for making a homogeneous CN-based fertilizer containing both sulphur and magnesium.

Based on the results from the above investigations, several tests were performed in a pilot plant. It was then confirmed that by using gypsum and slow reacting sulphate minerals like kieserite, langbeinite etc. together with a CN melt it would be possible to make homogeneous S-containing fertilizers which met the above stated objects of the invention.

Thus, according to the invention, solid gypsum and/or a slow reacting sulphate mineral could be mixed with melted calcium nitrate fertilizer at a temperature of 90–110° C. and kept at this temperature for 3–15 minutes and subsequently particulated at a temperature of 80–110° C.

The particulation by prilling should be performed at 95–110° C. and the granulation at 90–110° C.

Microamounts of Co and/or Se and/or micronutrients like Mn, Cu, B, and Zn could be added as solutions of their salts to the mixture prior to particulation.

One preferred method comprises mixing 4–23 weight % gypsum, based on the total composition, with a melted calcium nitrate fertilizer at 103–106° C. during stirring and keeping the mixture at this temperature for 5–10 minutes and then particulate the thus formed slurry.

Another preferred method comprises mixing 4–23 weight % kieserite during stirring with a melted calcium nitrate fertilizer for 6–12 minutes and subsequently particulate the thus formed slurry.

Fertilizers according to the invention comprise a homogeneous composition of a calcium nitrate fertilizer and gypsum and/or a slow reacting sulphate mineral comprising 0.1–5.0 weight % $SO_4$—S, 14–19 weight % water soluble calcium and 16–21 weight % total calcium and 0–3.0 weight % water soluble magnesium. Preferably said new fertilizer contains 1.0–3.0 weight % $SO_4$—S. The preferred content of magnesium is 0.1–4.0 weight %.

The scope and special features of the invention are as stated in the attached claims.

The invention is further explained by the following examples and the comments to these examples:

EXAMPLE 1

This example relates to formation of prilled homogeneous CN-based fertilizer by mixing 12 weight % kieserite crystals into NH—CN melt at 105° C. during stirring at this temperature for about 10 minutes and then spraying the slurry through a nozzle. The formed droplets solidified as they fell through cooling air.

The product thus formed had a homogeneous composition and had the following analysis:

15.0% N
2.6% $SO_4$—S
2.0% Mg (water soluble)
16.8% Ca (water soluble)

EXAMPLE 2

This example shows drum granulation of a homogeneous CN-based fertilizer. 7 weight % kieserite crystals were mixed into 93 weight % NH—CN melt at 105° C. and stirred for about 6 minutes. The slurry was then sprayed into a drum containing fines from example 1. Hard homogeneous granules were formed with the following composition:

15.2% N
1.5% $NH_4$—N
13.7% $NO_3$—N
1.5% $SO_4$—S
1.1% Mg (water soluble)
17.5% Ca (water soluble)

EXAMPLE 3

This example shows granulation of homogeneous CN-based fertilizer containing sulphur. 11.5 weight % calcium sulphate hemi hydrate (22.1 %S) was mixed with 88.5 weight % NH—CN melt at about 105° C. and stirred for about 5 minutes and subsequently sprayed into a rotating drum containing NH—CN fines.

The thereby formed product had the following analysis:

15.0% N
2.5% $SO_4$—S
16.8% Ca (water soluble)
20.0% total Ca

EXAMPLE 4

This example shows preparation of homogeneous CN-based fertilizer containing sulphur and magnesium and in addition selenium. 7 weight % kieserite and some droplets of a 25 weight % $Na_2SeO_4$ solution were mixed into a NH—CN melt at about 105° C. and stirred for about 5 minutes. The melt was solidified as in example 2.

The formed product had the following analysis:

15.2% N
1.5% $NH_4$—N
13.7% $NO_3$—N
1.5% $SO_4$—S
1.1% Mg (water soluble)
17.5% Ca (water soluble)
25 ppm Se Cobalt can be incorporated in the same way as selenium by addition of droplets of a $CoSO_4$ solution giving 0.02% of Co.

EXAMPLE 5

This example shows preparation of homogeneous CN-based fertilizer containing both sulphur and magnesium. 4 weight % gypsum (calcium sulphate hemi hydrate) and 6 weight % kieserite were thoroughly mixed into 90 weight % of NH—CN melt at about 105° C. for about 4 minutes. The thereby formed slurry was then sprayed into a granulating drum containing fines. Hard. homogeneous granules were formed with the following composition:

15.1% N
2.2% $SO_4$—S
1.0% Mg
16.7% water soluble Ca
17.8% total Ca

The main advantages attained by using both gypsum and kieserite for making such fertilizers are that gypsum is a cheaper sulphur source than kieserite and that the product is somewhat less hygroscopic than a product using only kieserite as sulphur and magnesium source.

From the above examples it can be seen that it is possible to prepare homogeneous S-containing fertilizers based on CN-fertilizers and a S-source. The new fertilizer can be particulated, for instance by prilling or granulation, both pan granulation and drum granulation. Further tests showed that a rather wide range of such fertilizers could be prepared. It was then found that the various components should be within the following ranges:

| | | |
|---|---|---|
| $SO_4$—S | 0.1–5.0 weight % | preferably: 1.0–3.0 weight % |
| Mg (w.s) | 0–4.0 weight % | preferably: 0–2.3 |
| Ca (w.s) | 14–19 weight % | preferably: 16–19 |
| Ca (total) | 16–21 weight % | |

In addition fertilizers of the above type can contain microamounts of cobalt and selenium, and the usual fertilizer micronutrients like manganese, copper zinc, boron etc.

Preparations of the above new fertilizers can be performed at the following conditions:

Recommended mixing temperature: 90–110° C.
Recommended retention time :3–15 minutes
Recommended particulation temperatures
Prilling: 100–110° C.
Granulation: 80–100° C.

The products of examples 1 and 2 were bagged and stored at a pressure of 1 kg/cm² for three months and there were no signs of caking. Also the rate of water absorption was tested for these new fertilizers and compared with conventional CN-fertilizers. The rate of absorption was measured at 60% relative humidity and 25° C. The recorded values are listed in the below table:

TABLE 1

| Product | Water absorbed % 1 hour | Water absorbed % 24 hours |
|---|---|---|
| NH—CN uncoated | 2.0 | 28.1 |
| NH—CN coated | 0.4 | 7.0 |
| NH—CN + 1.5% S (uncoated kieserite) | 2.7 | 9.7 |
| NH—CN + 1.5% S (coated kieserite) | 0.7 | 32 |
| NH—CN + 2.5% S | 2.9 | 33 |
| NH—CN + 2.5% S (coated gypsum) | 0.5 | 7.5 |
| NH—CN + 15% S + Se (coated) | 0.6 | 31.5 |

From these data it can be seen that fertilizers based on CN and kieserite had somewhat higher hygroscopicity compared to pure CN-fertilizer. The increase is very modest and due to the formation of some $Mg(NO_3)_2$. The increase of water absorption can be compensated by increasing the amount of coating applied.

By the present invention the inventors have managed to arrive at a method for making a new type of fertilizer being a homogeneous fertilizer based on calcium nitrate and containing the required amount of sulphur. Said new fertilizer may also contain magnesium and microamounts of Se and Co and micronutrients like Mn, Cu, B, Zn etc.

What is claimed is:

1. A method for making calcium nitrate based fertilizers containing sulphur, which consists of mixing solid gypsum and/or a slow reacting sulphate mineral with melted calcium nitrate fertilizer at a temperature of 90–110° C., maintaining the mixture at this temperature for 3–15 minutes, and subsequently particulating the mixture at a temperature of 80–110° C.

2. A method according to claim 1, characterized in that 4–23 weight % gypsum, based on the total composition, is mixed with the melted calcium nitrate fertilizer at 103–106° C. while stirring and kept at this temperature for 5–10 minutes to form a slurry and the formed slurry is particulated by prilling or granulation.

3. A method according to claim 1, characterized in that 4–23 weight % solid kieserite is mixed while stirring with the melted calcium nitrate fertilizer for 6–12 minutes to form a slurry and the formed slurry is subsequently particulated.

4. A method according to claim 1, characterized in that:

the particulation is by prilling performed at 95–110° C. or by granulation performed at 90–110° C.

5. A method according to claim 1, characterized in that:

selenium, cobalt, and micronutrients are added as solutions of their salts into the mixture prior to particulation.

6. A method according to claim 5, wherein the micronutrients comprise manganese.

7. A calcium nitrate based fertilizer containing sulphur, characterized in that the fertilizer is a homogeneous composition of a calcium nitrate fertilizer and gypsum and/or a slow reacting sulphate mineral consisting of 0.1–5.0 weight % S as derived from $SO_4$, 14–19 weight % water soluble calcium and 16–21 weight % total calcium, and 0–4.0 weight % water soluble magnesium.

8. A fertilizer according to claim 7, characterized in that the calcium based fertilizer containing sulfur contains 1.0–3.0 weight % S as derived from $SO_4$.

9. A fertilizer according to claim 7, characterized in that:

the calcium nitrate based fertilizer containing contains sulphur 0–2.3 weight % water soluble magnesium.

10. A fertilizer according to claim 7, characterized in that:

the calcium nitrate based fertilizer comataining sulphur contains microamounts of Se and/or Co, and/or micronutrients.

11. A fertilizer according to claim 10, wherein the micronutrients are selected from the group consisting of Mn, Cu, B and Zn.

* * * * *